United States Patent
Tsuchiya et al.

(10) Patent No.: US 7,889,291 B2
(45) Date of Patent: Feb. 15, 2011

(54) LIQUID CRYSTAL DISPLAY DEVICE AND ELECTRONIC APPARATUS

(75) Inventors: Yutaka Tsuchiya, Hara-mura (JP); Toshiharu Matsushima, Tottori (JP)

(73) Assignee: Seiko Epson Corporation (JP)

( * ) Notice: Subject to any disclaimer, the term of this patent is extended or adjusted under 35 U.S.C. 154(b) by 161 days.

(21) Appl. No.: 12/394,254

(22) Filed: Feb. 27, 2009

(65) Prior Publication Data
US 2009/0244444 A1    Oct. 1, 2009

(30) Foreign Application Priority Data
Mar. 26, 2008  (JP) .............................. 2008-081067
Nov. 17, 2008  (JP) .............................. 2008-293370

(51) Int. Cl.
*G02F 1/1333*    (2006.01)
(52) U.S. Cl. .............................. 349/86; 349/56; 349/74; 349/77; 349/81; 349/88
(58) Field of Classification Search .................. 349/56, 349/74, 77, 81, 86, 88
See application file for complete search history.

(56) References Cited

U.S. PATENT DOCUMENTS 6,130,735 A * 10/2000 Hatanaka et al. ............ 349/113

7,236,655 B2 * 6/2007 Momoki et al. ............... 385/11

FOREIGN PATENT DOCUMENTS

| JP | 05-027220 | 2/1993 |
| JP | 09-073070 | 3/1997 |
| JP | 2004-283548 | 10/2004 |
| JP | 2006-141559 | 6/2006 |

* cited by examiner

*Primary Examiner*—Jennifer Doan
(74) *Attorney, Agent, or Firm*—Lowe Hauptman Ham & Berner, LLP

(57) ABSTRACT

A liquid crystal display device is provided which includes: a liquid crystal panel; an image information application unit disposed on a side opposite to a display side of the liquid crystal panel; an illumination unit for irradiating light to the image information application unit; a liquid crystal shutter device disposed between the image information application unit and the liquid crystal panel; a polymer dispersion type liquid crystal layer disposed in the liquid crystal shutter device and containing liquid crystal molecules and polymers, in which the polymers are aligned in a twisted manner at a twist angle larger than 0 degree and smaller than 180 degrees; and a polarization layer disposed between the liquid crystal panel and the liquid crystal shutter device so that in a rotation direction where the polymers are aligned in a twisted manner, an absorption axis thereof is set in a direction substantially perpendicular to a radial direction where the polymers are twisted by half the twist angle.

7 Claims, 9 Drawing Sheets

FIG. 8A
FIG. 8B
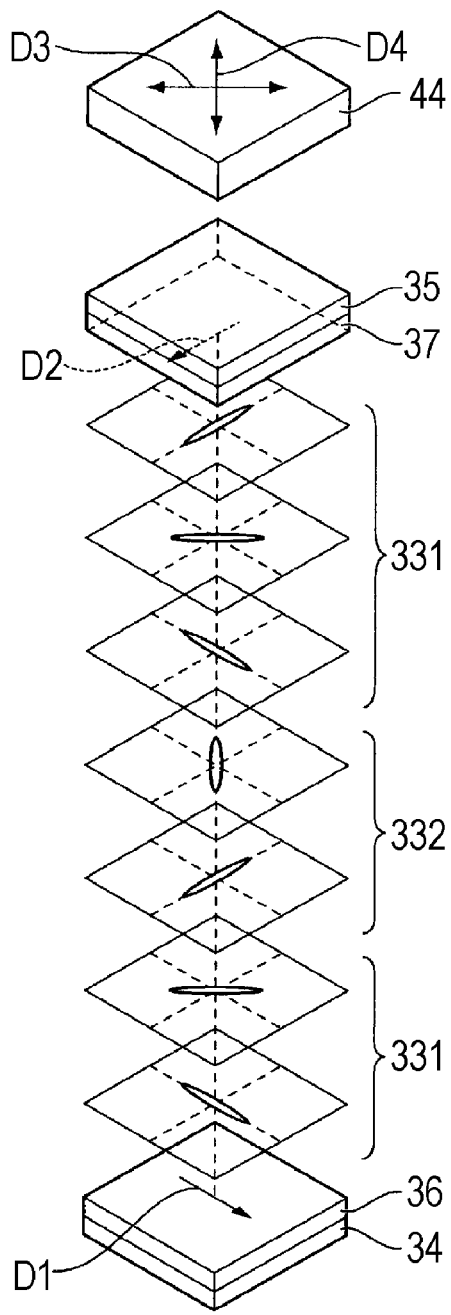
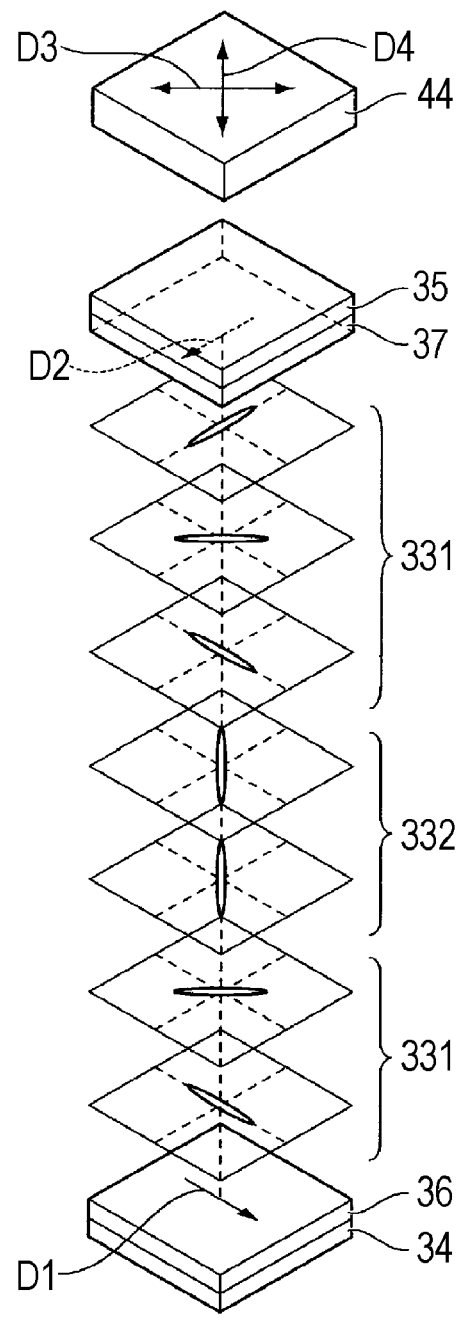

LIQUID CRYSTAL DISPLAY DEVICE AND ELECTRONIC APPARATUS

RELATED APPLICATIONS

The present application is based on, and claims priority from, Japanese Patent Application Numbers 2008-081067, filed Mar. 26, 2008 and 2008-293370, filed Nov. 17, 2008, the disclosures of which are hereby incorporated by reference herein in their entireties.

BACKGROUND

1. Technical Field

The present invention relates to a liquid crystal display device and an electronic apparatus.

2. Related Art

In the related art, there is known a technique in which a liquid crystal shutter device is disposed on an illumination unit side of a transmission type liquid crystal panel to thereby adjust light incident on the transmission type liquid crystal panel (reference should be made to, for example, JP-A-9-073070, JP-A-2004-283548, and JP-A-2006-141559).

The liquid crystal shutter device includes a liquid crystal layer sandwiched between a pair of electrodes. A polymer dispersion type liquid crystal layer is an example of the liquid crystal layer used in the liquid crystal shutter device. The polymer dispersion type liquid crystal layer contains liquid crystal molecules and polymers. The polymer dispersion type liquid crystal layer is formed by causing a mixture of polymeric precursors and liquid crystal molecules to be disposed between a pair of electrodes and then, irradiating the mixture with energy. The polymeric precursors are polymerized by the energy irradiation to be changed into polymers, and the polymers are phase-separated from the liquid crystal molecules.

The polymer dispersion type liquid crystal layer is classified into a reverse type and other types depending on presence or absence of its alignment state under a non-electric field application state. In a reverse type polymer dispersion type liquid crystal layer, polymers and liquid crystal molecules are aligned together with each other in the non-electric field application state. In the reverse type polymer dispersion type liquid crystal layer, the polymers are formed with liquid crystal monomers as the polymeric precursors. By causing the liquid crystal monomers to be polymerized in an aligned state, aligned polymers are obtained. Since the polymers per se are aligned, the polymers exert an alignment regulating force of aligning the liquid crystal molecules.

In the reverse type polymer dispersion type liquid crystal layer, since the refractive index of the polymers and the liquid crystal molecules in the non-electric field application state are constant or change continuously, the polymer dispersion type liquid crystal layer operates in a non-scattering mode where incident light is emitted without being scattered. Moreover, in an electric field application state, an alignment direction of the liquid crystal molecules is changed by the electric field, the refractive index is discontinuous between the liquid crystal molecule portion and the polymer portion. Therefore, the polymer dispersion type liquid crystal layer operates in a scattering mode where incident light is emitted in a scattered manner.

In an image display device disclosed in JP-A-9-073070, a reverse type liquid crystal shutter device is used for adjustment of a viewing angle. Light emitted outside a predetermined viewing angle is scattered by the liquid crystal shutter device so that an image represented by the light is not visually perceived.

In a game machine disclosed in JP-A-2004-283548 and JP-A-2006-141559, a liquid crystal shutter device is used for switching of displays by a display unit of the game machine. Light representing a base image is incident on a liquid crystal panel via the liquid crystal shutter device, is appropriately modulated therein, and is emitted from the display unit. In a non-scattering mode of the liquid crystal shutter device, the light representing the base image is passed through the liquid crystal shutter device without being scattered, whereby the base image is displayed to be overlapped with an additional image by the liquid crystal panel. In a scattering mode of the liquid crystal shutter device, the light representing the base image is passed through the liquid crystal shutter device in a scattered manner, whereby only an image by the liquid crystal panel is displayed. In this manner, in the game machine disclosed in JP-A-2004-283548 and JP-A-2006-141559, it is possible to display images with plenty of expressiveness by the display unit, and to thus provide versatile presentations.

However, in such a display unit as disclosed in JP-A-2004-283548 and JP-A-2006-141559, it is generally considered that the liquid crystal shutter device is mainly used in the non-scattering mode. This is because in the scattering mode, the expressiveness of the display unit is not sufficiently exhibited since the base image is not displayed. If the non-scattering mode is mainly used, the period in which the liquid crystal shutter device is used in the scattering mode becomes longer than the period in which it is used in the non-scattering mode.

In such an electronic apparatus, it is considered good to use a reverse type liquid crystal shutter device as in the case of JP-A-9-073070. This is because according to the reverse type liquid crystal shutter device, since it operates in the non-scattering mode under the non-electric field application state, the consumption power of the liquid crystal shutter device becomes small and deterioration in alignment property with driving is suppressed, and thus, the operating life of the liquid crystal shutter device can be increased.

However, when the reverse type liquid crystal shutter device is applied to such a display unit as disclosed in JP-A-2004-283548 and JP-A-2006-141559, the following disadvantages may be caused.

In the reverse type liquid crystal shutter device, the alignment direction of the polymers does not change depending on presence or absence of electric field application. Therefore, a portion of light incident on the liquid crystal shutter device might be emitted without being scattered irrespective of presence or absence of electric field application, so that leakage light may be emitted from the liquid crystal shutter device in the scattering mode. As a result, a portion of the base image may be displayed by the leakage light during a non-display period of the base image, whereby display quality is deteriorated.

Moreover, in the image display device disclosed in JP-A-9-073070, by the same reasons, there is a disadvantage that images may be visually perceived from outside a predetermined viewing angle.

SUMMARY

An advantage of some aspects of the invention is that it provides a liquid crystal display device capable of preventing a leakage light of a liquid crystal shutter device from being visually perceived.

According to an aspect of the invention, there is provided a liquid crystal display device including: a liquid crystal panel;

an image information application unit disposed on a side opposite to a display side of the liquid crystal panel; an illumination unit for irradiating light to the image information application unit; a liquid crystal shutter device disposed between the image information application unit and the liquid crystal panel; a polymer dispersion type liquid crystal layer disposed in the liquid crystal shutter device and containing liquid crystal molecules and polymers, in which the polymers are aligned in a twisted manner at a twist angle larger than 0 degree and smaller than 180 degrees; and a polarization layer disposed between the liquid crystal panel and the liquid crystal shutter device so that in a rotation direction where the polymers are aligned in a twisted manner, an absorption axis thereof is set in a direction substantially perpendicular to a radial direction where the polymers are twisted by half the twist angle.

When the polymers are aligned in such a manner, the liquid crystal molecules are aligned in a manner similar to the polymers by the alignment regulating force of the polymers, whereby a twisted structure is obtained in which the alignment direction changes continuously in the polymers and the liquid crystal molecules. The twisted structure in a non-electric field application state is distributed in a range corresponding to the twist angle on a projection plane perpendicular to an axial direction thereof. The refractive index in the non-electric field application state in the axial direction of the twisted structure is constant or changes continuously. Moreover, in an electric field application state, the liquid crystal molecules are oriented in the electric field direction, and thus, the refractive index in the range corresponding to the twist angle is discontinuous between the polymers and the liquid crystal molecules. That is, the polymer dispersion type liquid crystal layer functions as a reverse type so that it operates in a non-scattering mode where incident light is emitted substantially without being scattered under the non-electric field application state while operating in a scattering mode where incident light is emitted in a scattered manner under the electric field application state.

The light emitted from the illumination unit is incident on the liquid crystal shutter device with image information being applied thereto by the image information application unit. The light incident on the liquid crystal shutter device is incident on the liquid crystal panel as white light with the image information being lost by the scattering when the liquid crystal shutter device is in the scattering mode. This light is emitted after being appropriately modulated by the liquid crystal panel to become a display image not containing the image information by the image information application unit. When the liquid crystal shutter device is in the non-scattering mode, light which has not been scattered and contains the image information is incident on the liquid crystal panel, and the light is emitted after being appropriately modulated by the liquid crystal panel to become a display image containing the image information by the image information application unit. In this manner, by switching between the scattering mode and the non-scattering mode, it is possible to switch between on and off of the image information by the image information application unit.

However, in areas of the projection plane where the polymers are not present, a discontinuous refractive index plane where the refractive index of the liquid crystal molecule and the polymer is discontinuous in the axial direction of the twisted structure is not formed at the time of electric field application. Polarized light mainly oscillating in such areas is not scattered in the scattering mode and emitted as leakage light. In this manner, the polarized light oscillating in a direction (hereinafter, often referred to as a non-scattering direction) perpendicular to a radial direction where the polymers are twisted by half a twist angle in a rotation direction where the polymers are aligned in a twisted manner is made hard to be scattered.

In the present invention, since the polarization layer is provided at an incident side of the liquid crystal panel so that an absorption axis thereof is substantially identical with the non-scattering direction of the twisted structure, most of the leakage light is absorbed in the polarization layer. Therefore, the leakage light is prevented from being emitted after being modulated in the liquid crystal panel, whereby the image by the image information application unit is prevented from being visually perceived by the leakage light in the scattering mode. Therefore, it is possible to effectively switch between on and off of the image information by the image information application unit, and thus, the liquid crystal display device is able to provide versatile display images. Furthermore, when the twist angle is smaller than 180 degrees, it is possible to achieve a decrease in a driving voltage of the liquid crystal shutter device and improvement in responsiveness thereof compared with a case where the twist angle is larger than 180 degrees.

According to another aspect of the invention, there is provided a liquid crystal display device including: a liquid crystal panel; an image information application unit disposed on a side opposite to a display side of the liquid crystal panel; an illumination unit for irradiating light to the image information application unit; a liquid crystal shutter device disposed between the image information application unit and the liquid crystal panel; a polymer dispersion type liquid crystal layer disposed in the liquid crystal shutter device and containing liquid crystal molecules and polymers, in which the polymers are aligned in a twisted manner at a twist angle larger than 180 degree and smaller than 360 degrees; and a polarization layer disposed between the liquid crystal panel and the liquid crystal shutter device so that in a rotation direction where the polymers are aligned in a twisted manner, an absorption axis thereof is set in a direction substantially perpendicular to a radial direction where the polymers are twisted by half an angle subtracted from the twist angle by 180 degrees.

By doing this, by causing the liquid crystal shutter device to switch between the scattering mode and the non-scattering mode, the liquid crystal display device is able to switch between on and off of the image information by the image information application unit. Moreover, since the twist angle is larger than 180 degrees, it is possible to eliminate a range of areas on the projection plane where the twisted structure is not present, whereby generation of the leakage light which is not scattered in the scattering mode can be greatly reduced. The leakage light from the liquid crystal shutter device becomes a polarized light oscillating in a direction (non-scattering direction) substantially perpendicular to the radial direction where the polymers are twisted by half an angle subtracted from the twist angle by 180 degrees in the rotation direction where the polymers are aligned in a twisted manner. Since the polarization layer is disposed so that the absorption axis thereof is identical with the non-scattering direction, leakage light produced in little amount can be absorbed in the polarization layer. Therefore, it is possible to certainly prevent the image by the image information application unit from being visually perceived by the leakage light in the scattering mode, whereby the liquid crystal display device is able to provide versatile display images.

The absorption axis of the polarization layer and the radial direction may be at an angle of 12.9 degrees or less.

Although will be described in detail in DESCRIPTION OF EXEMPLARY EMBODIMENTS, by doing this, the transmittance of non-scattered light which has not been scattered by the liquid crystal shutter device with respect to the polarization layer will be 5 percent or less. Therefore, the image by the non-scattered light is not visually perceived, and thus, the liquid crystal display device is able to provide versatile display images.

The liquid crystal display device may further include a pair of electrodes disposed in the liquid crystal shutter device so as to sandwich the polymer dispersion type liquid crystal layer; a first alignment film disposed between a first electrode of the pair of electrodes and the polymer dispersion type liquid crystal layer and having an alignment regulating force of causing the polymers to be aligned in a first direction; and a second alignment film disposed between a second electrode of the pair of electrodes and the polymer dispersion type liquid crystal layer and having an alignment regulating force of causing the polymers to be aligned in a second direction that is twisted by the twist angle in the rotation direction from the first direction.

By doing this, in the polymer dispersion type liquid crystal layer, the polymers contained therein will be aligned in the first direction in the first electrode side and will be aligned in the second direction in the second electrode side. In this manner, since the twist angle of the polymers in the polymer dispersion type liquid crystal layer can be defined with high precision, the polarization direction of the leakage light in the scattering mode can be defined with high precision. Therefore, it is possible to cause the polarization direction of the leakage light and the absorption axis of the polarization layer to be aligned with high precision, whereby the leakage light can be effectively absorbed in the polarization layer.

Moreover, the polymer dispersion type liquid crystal layer may be formed with a chiral agent added thereto.

By doing this, it is possible to increase the twist angle to be larger than 90 degrees, whereby the range of areas on the projection plane where the twisted structure is not present can be narrowed. Therefore, the leakage light in the scattering mode can be reduced, and the non-scattered leakage light produced in little amount can be absorbed in the polarization layer as described above, whereby emission of the leakage light from the liquid crystal panel is substantially absolutely prevented.

Furthermore, the illumination unit may be disposed in the image information application unit at a side opposite to a side where the liquid crystal panel is disposed.

By doing this, since light irradiated from the illumination unit is incident on the liquid crystal panel via the image information application unit, the illumination unit might not be visually perceived directly from outside. Moreover, for example, even when the image information application unit is a curved surface that is concave toward the illumination unit, it is possible to obviate a case where a portion of the surface is shaded by the surface per se.

According to a further aspect of the invention, there is provided an electronic apparatus having a display unit configured by the liquid crystal display device according to the above-described aspect of the invention.

Since the liquid crystal display device according to the above aspect of the invention is able to provide versatile display images, the electronic apparatus including the display unit configured by the same can be effectively used.

BRIEF DESCRIPTION OF THE DRAWINGS

The invention will be described with reference to the accompanying drawings, wherein like numbers reference like elements.

FIGS. 8A and 8B are schematic perspective views illustrating main parts of a second embodiment of the present invention.

DESCRIPTION OF EXEMPLARY EMBODIMENTS

Hereinafter, embodiments of the present invention will be described; however, the technical scope of the present invention is not limited to the following embodiments. In the following description, although a variety of structures will be illustrated with reference to accompanying drawings, in order to better illustrate characteristic parts of the structures, the structures in the figures may often be depicted with dimensions or scales thereof different from those of the actual structures. Moreover, the present embodiment is an example where the liquid crystal display device of the present invention is applied to a display unit of a pachislo machine.

First Embodiment

Figure 1:
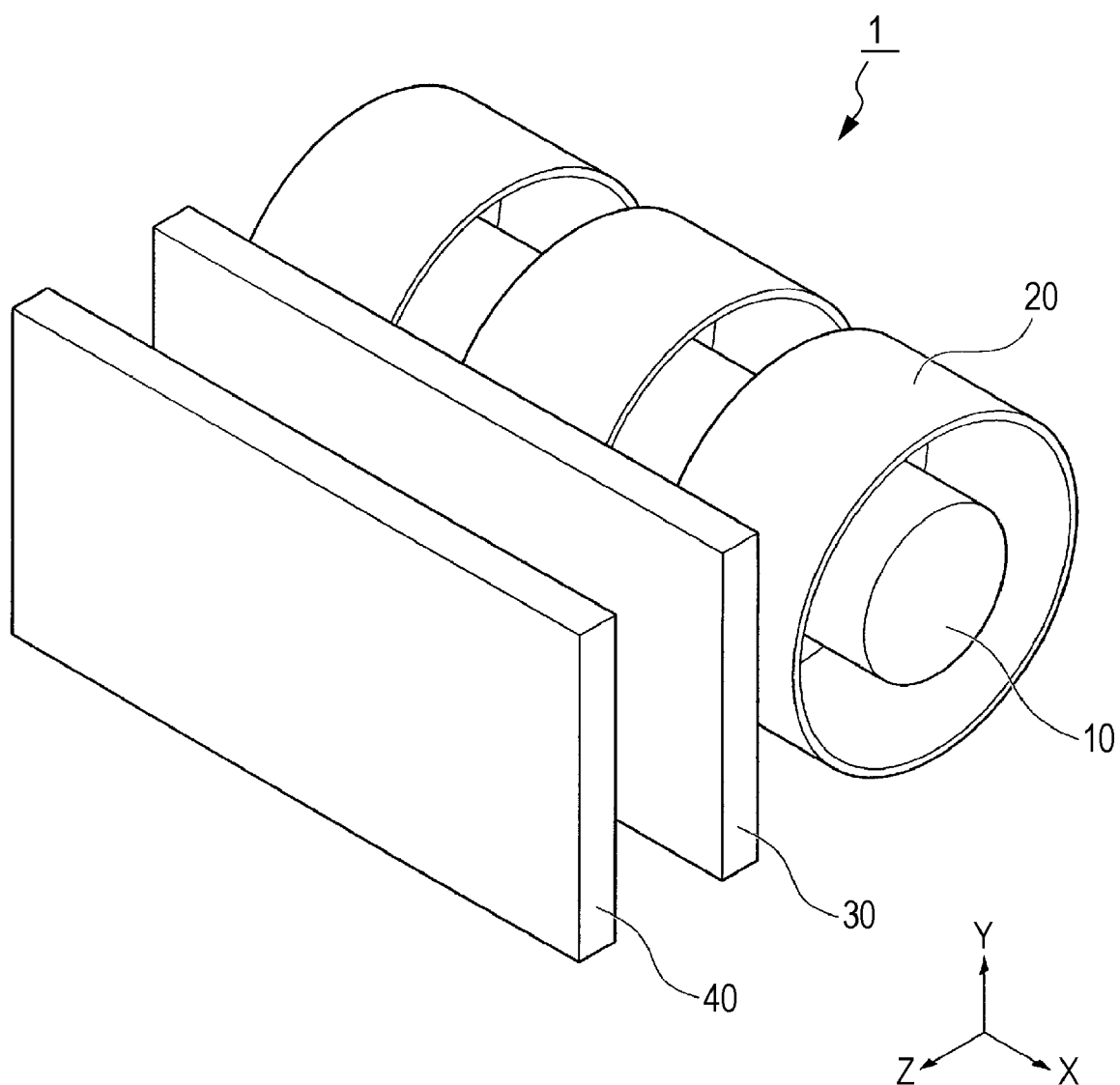
FIG. 1 is a perspective view illustrating a simplified structure of a liquid crystal display device according to a first embodiment of the present invention.

FIG. 1 is a perspective view illustrating a simplified structure of a liquid crystal display device 1 according to a first embodiment of the present invention.

As illustrated in FIG. 1, the liquid crystal display device 1 has three cylindrical rotating reels (image information application unit) 20 that are axially arranged at regular intervals and one illumination unit 10 that is inserted in common into the rotating reels 20. Further, a liquid crystal shutter device 30 and a liquid crystal panel 40 are provided to the rotating reels 20 at a side opposite to a side where the illumination unit 10 is disposed. Light emitted from the illumination unit 10 passes in order through the rotating reels 20, the liquid crystal shutter device 30, and the liquid crystal panel 40, and images are displayed when the light is visually perceived.

Although the present embodiment illustrates a configuration in which the illumination unit 10 is disposed at a side of the rotating reels 20 opposite to the side where the liquid crystal panel 40 is disposed, the invention is not limited to such a configuration but the illumination unit 10 may have a configuration in which it is disposed on an obliquely upper side and/or lower side of a front surface of the rotating reels 20 to irradiate light toward the rotating reels 20.

Hereinafter, a description of the positional relationship between the components will be provided based on the XYZ orthogonal coordinate system illustrated in FIG. 1. According to the XYZ orthogonal coordinate system, an axial direction where the rotating reels 20 are arranged is the X direction, a direction (a traveling direction of light emitted from the illumination unit 10) where the liquid crystal shutter device 30 and the liquid crystal panel 40 are disposed with respect to the rotating reels 20 is the Z direction, and a direction perpendicular to the X direction and the Z direction is the Y direction. The rotating reels 20, the liquid crystal shutter device 30, and the liquid crystal panel 40 are disposed to overlap with each other in the Z direction. In this XYZ orthogonal coordinate system, the direction indicated by the arrows will often be referred to a positive direction, and the direction opposite to the direction indicated by the arrows will often be referred to as a negative direction.

The rotating reels (image information application unit) 20 are formed by printing a predetermined design pattern (image) on an outer surface of a band-like white semi-transmissive film, for example, and winding the film into a cylindrical shape by binding both ends thereof. Moreover, a stepping motor or the like is provided in the rotating reels 20, so that it is possible to control the rotation angle of the rotating reels 20. Light emitted from the illumination unit 10 passes through the rotating reels 20 and is appropriately colored by the design pattern disposed on the side of the liquid crystal shutter device 30, or a portion thereof is blocked. The design pattern is made to change in the circumferential direction of the rotating reels 20, so that light representing the design pattern corresponding to the rotation angle of the rotating reels 20 is emitted to the side of the liquid crystal shutter device 30. The function of the liquid crystal shutter device 30 and the liquid crystal panel 40 will be described briefly herein below and detailed structure thereof will be provided later.

The liquid crystal shutter device 30 has a plurality of light scattering portions and is able to cause each of the light scattering portions to switch between a scattering mode and a non-scattering mode. The scattering mode is a mode where incident light is emitted in a scattered manner, and therefore, in the scattering mode, light representing the design pattern is mixed together by the scattering to be emitted as white light. A non-scattering mode is a mode where incident light is emitted without being scattered, and therefore, in the non-scattering mode, most of the light representing the design pattern is transmitted to be emitted intact. The emitted scattered light or non-scattered light is incident on the liquid crystal panel 40.

The liquid crystal panel 40 is configured to be able to perform gradation display by appropriately modulating the incident light. When the scattered light (white light) is incident on the liquid crystal panel 40, the scattered light becomes light representing the image by the liquid crystal panel 40 to be emitted from the liquid crystal panel 40. When the non-scattered light is incident on the liquid crystal panel 40, the incident light is modulated by the liquid crystal panel 40 while reflecting the design pattern, and thus, light representing a composite image of the design pattern (image) and the image by the liquid crystal panel 40 is emitted therefrom. In this manner, by the mode switching of the liquid crystal shutter device 30, it is possible to select whether or not the design pattern printed on the rotating reels 20 will be reflected on a resulting display.

Figure 2:
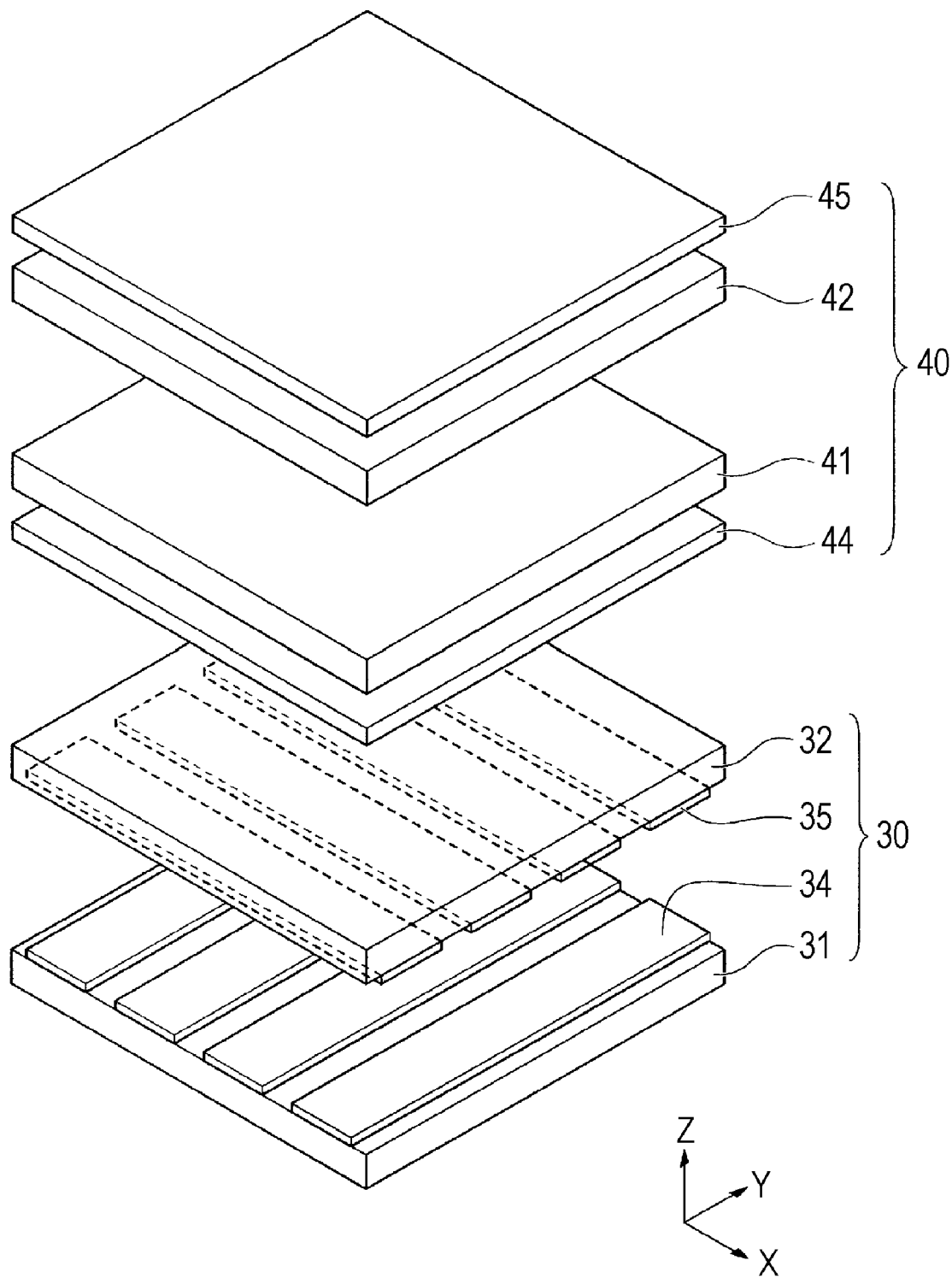
FIG. 2 is a schematic perspective view illustrating a simplified structure of a liquid crystal shutter device and a liquid crystal panel.

FIG. 2 is a schematic perspective view illustrating a simplified structure of the liquid crystal shutter device 30 and the liquid crystal panel 40. As illustrated in FIG. 2, the liquid crystal shutter device 30 according to the present embodiment includes a first substrate 31 having a first electrode (segment electrode) 34 and a second substrate 32 having a second electrode (common electrode) 35.

The first substrate 31 and the second substrate 32 both have, as a base thereof, a transparent substrate formed of glass, quartz, plastic, or the like. The first substrate 31 and the second substrate 32 are disposed to oppose each other and a reverse type polymer dispersion type liquid crystal layer (described later) is sealed between them. In this example, a plurality of segment electrodes 34 is provided to extend along the Y direction to be parallel with each other, and a plurality of common electrodes 35 is provided to extend along the X direction to be parallel with each other.

The liquid crystal panel 40 includes a polarization layer 44, a TFT substrate 41, an opposing substrate 42, and a polarization layer 45, which are arranged in this order from the side of the liquid crystal shutter device 30 (in the negative Z direction). Moreover, a liquid crystal layer is sealed between the TFT substrate 41 and the opposing substrate 42.

Figure 3A:
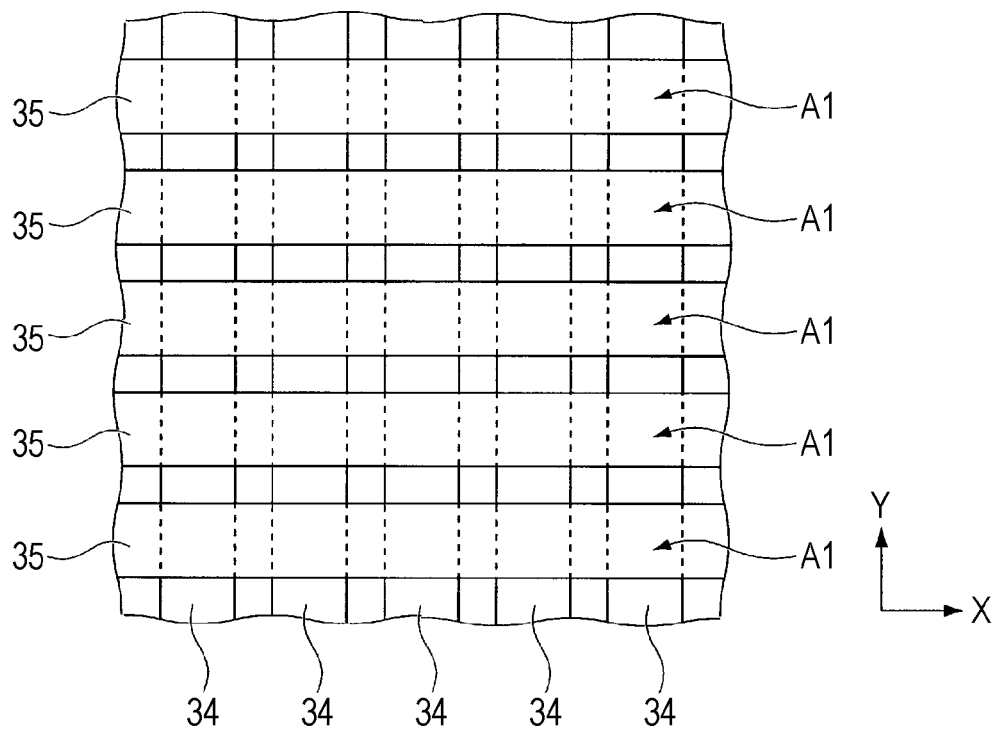
FIG. 3A is a top plan view of the liquid crystal shutter device.
Figure 3B:
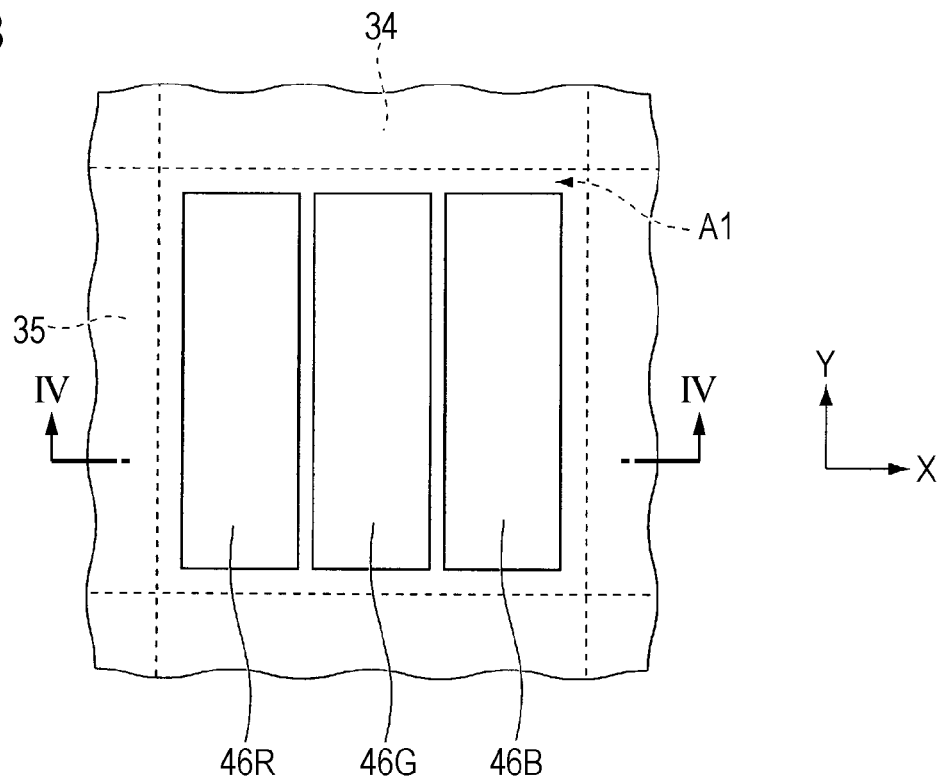
FIG. 3B is an enlarged top plan view of a driving region.

FIG. 3A is a top plan view illustrating the arrangement of the segment electrodes 34 and the common electrodes 35 in the liquid crystal shutter device 30. FIG. 3B is an enlarged top plan view of a portion of the liquid crystal panel 40 overlapping with one driving region.

As illustrated in FIG. 3A, the segment electrodes 34 and the common electrodes 35 are arranged to intersect each other, and driving regions A1 are formed at a plurality of regions where they intersect each other to overlap with each other. When an electric voltage is applied between the segment electrodes 34 and the common electrodes 35, an electric field is applied to the polymer dispersion type liquid crystal layers of the driving regions A1, whereby it is able to control an azimuth angle of the liquid crystal molecules of the polymer dispersion type liquid crystal layers. In this example, the segment electrodes 34, the common electrodes 35, and the polymer dispersion type liquid crystal layer of one driving region A1 constitutes one light scattering portion. Such a light scattering portion is disposed in respective one of the plurality of driving regions A1.

The liquid crystal panel 40 according to the present embodiment is capable of performing full-color display. As illustrated in FIG. 3B, the TFT substrate 41 is provided with sub-pixels 46R, 46G, and 46B, which correspond to red light, green light, and blue light, respectively. These three sub-pixels 46R, 46G, and 46B constitute a pixel which is a minimum unit of full-color display. The TFT substrate 41 is provided with a number of such pixels, and light blocking regions are formed at regions between the sub-pixels 46R, 46G, and 46B or between pixels. Although in this example, one pixel is disposed to overlap with one driving region A1, a plurality of pixels may be disposed in one driving region.

Figure 4:
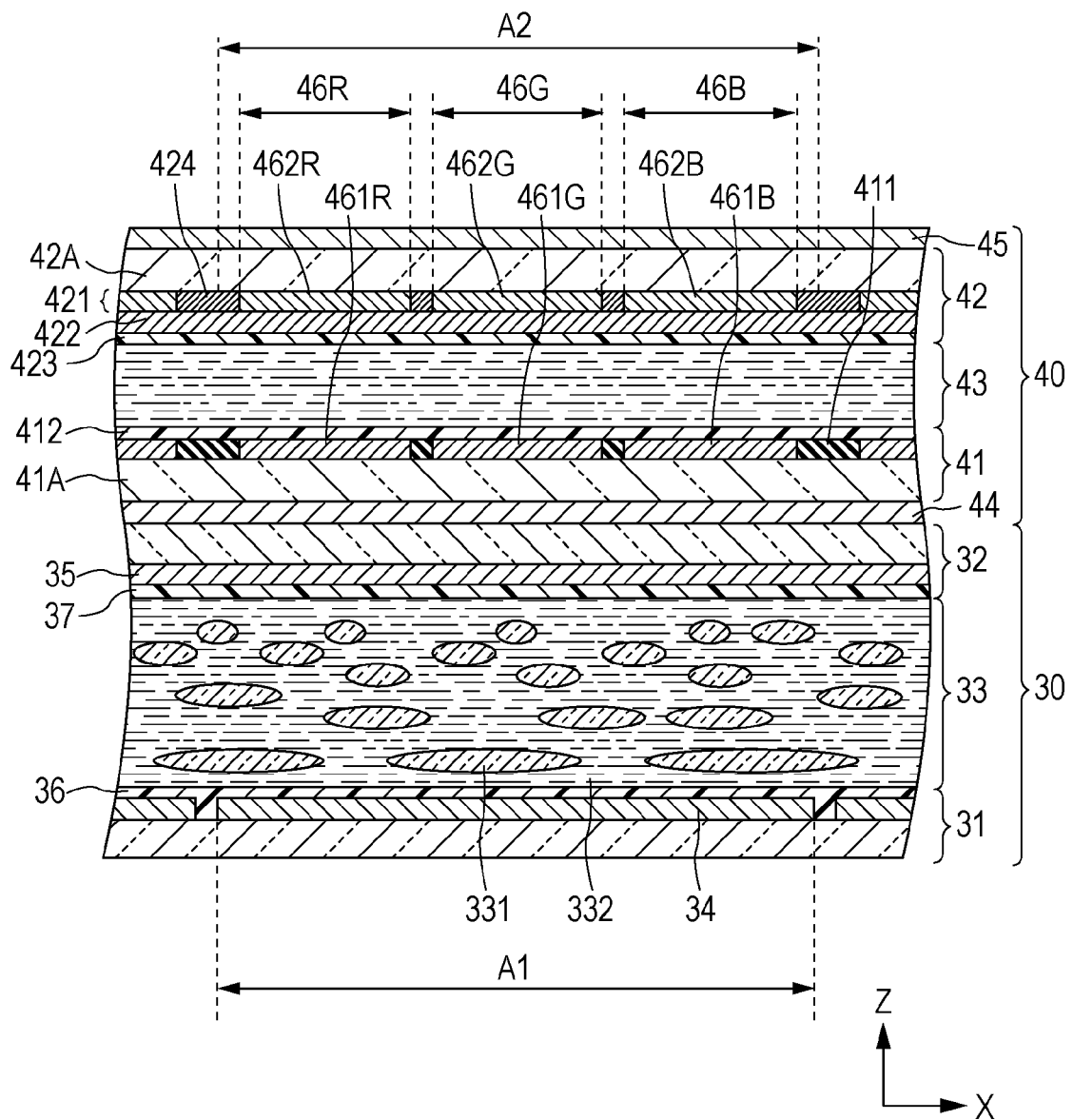
FIG. 4 is a cross-sectional view taken along the line IV-IV in FIG. 3B.

FIG. 4 is a cross-sectional view taken along the line IV-IV in FIG. 3B. As illustrated in FIG. 4, a polymer dispersion type liquid crystal layer 33 is sandwiched between the first substrate 31 and the second substrate 32 of the liquid crystal shutter device 30. The polymer dispersion type liquid crystal layer 33 includes a transparent polymer portion 331 formed by polymerizing liquid-crystalline monomers and a liquid crystal portion 332 containing liquid crystal molecules.

A first alignment film 36 is provided between the segment electrodes 34 and the polymer dispersion type liquid crystal layer 33, and a second alignment film 37 is provided between the common electrodes 35 and the polymer dispersion type liquid crystal layer 33. The first alignment film 36 and the second alignment film 37 are capable of controlling the alignment direction of the liquid crystalline monomers when forming the liquid crystal shutter device 30 so that the polymer portion 331 has an alignment regulating force. The liquid crystal molecules in the liquid crystal portion 332 are aligned in a predetermined direction under a non-electric field application state by the alignment regulating force.

Such a liquid crystal shutter device 30 can be manufactured, for example, by the following manner. First, the segment electrodes 34 are formed in a transparent substrate, and a film is formed using a forming material (e.g., polyimide) of the first alignment film 36 so as to cover the segment electrodes 34. Then, rubbing processing or the like is performed on the film along a first direction (e.g., the X direction) so that the film has an alignment regulating force in the first direction, and the resulting film is used as the first alignment film 36. In this manner, the first substrate 31 is formed, and the second substrate 32 is formed in a similar manner. When forming the second alignment film 37, an alignment regulating force is imparted in a second direction (e.g., the Y direction) different from the first direction. Moreover, alignment processing other than the rubbing processing may be performed, and a film may be formed using silicon oxides, for example, by an oblique film-forming method so that a film having an alignment regulating force is directly formed.

Subsequently, the first substrate 31 and the second substrate 32 are disposed so as to oppose each other so that the first alignment film 36 and the second alignment film 37 are oriented toward the inner side, and a mixture of a polymeric precursor (polymer portion forming material) such as liquid crystalline monomers and liquid crystal molecules is disposed between the substrates. By doing so, the liquid crystal monomers and the liquid crystal molecules on the side of the first substrate 31 are aligned in the first direction by the alignment regulating force of the first alignment film 36, while on the side of the second substrate 32, they are aligned in the second direction by the alignment regulating force of the second alignment film 37. In this way, a twisted structure is formed by the liquid crystalline monomers and the liquid crystal molecules, in which the alignment direction thereof is twisted between the side of the first substrate 31 and the side of the second substrate 32. A twist angle which is a twisted angle of the alignment direction as seen in top plan view is an angle (in this example, 90 degrees) formed between the first direction and the second direction.

Next, energy such as ultra-violet light or the like is irradiated to thereby polymerize the liquid crystalline monomers. In this way, a solid-state polymer portion 331 is formed, and the liquid crystal molecules are phase-separated to form the liquid crystal portion 332. The polymer portion 331 is formed to be dispersed in the polymer dispersion type liquid crystal layer 33. In this way, the polymer dispersion type liquid crystal layer 33 is obtained, and the liquid crystal shutter device 30 is obtained, for example, by appropriately sealing the polymer dispersion type liquid crystal layer 33.

Returning now to the description of FIG. 4, the liquid crystal panel 40 is disposed in the positive Z direction of the liquid crystal shutter device 30. The liquid crystal panel 40 according to the present embodiment includes the polarization layer 44, the TFT substrate 41, the liquid crystal layer 43, the opposing substrate 42, and the polarization layer 45, which are arranged in this order from the side of the liquid crystal shutter device 30. The polarization layer 44 is disposed so that an absorption axis thereof is perpendicular to a direction that is twisted from the first direction by half the twist angle. Moreover, the polarization layer 45 is disposed so that an absorption axis thereof is perpendicular to the absorption axis of the polarization layer 44.

The TFT substrate 41 is an active-matrix type substrate, for example, and has, as a base thereof, a transparent substrate 41A formed of glass, quartz, plastic, or the like. On the liquid crystal layer 43 side (the positive Z direction side) of the transparent substrate 41A, switching elements such as TFTs (thin film transistors), a variety of types of wirings such as data lines or scan lines, and the like are formed. On a surface of the TFT substrate 41, pixel electrodes 461R, 461G, and 461B electrically connected to the switching elements are formed and constitute a portion of respective one of the sub-pixels 46R, 46G, and 46B. The sub-pixels 46R, 46G, and 46B constitute a pixel A2.

Moreover, an insulation portion 411 formed of silicon oxides or the like is formed between the pixel electrodes, and the variety of types of wirings or the like are formed on a lower layer side of the insulation portion 411. The pixel electrodes 461R, 461G, and 461B are electrically connected to signal sources such as data line driving circuits via the switching elements, the wirings, or the like. Image signals from the signal sources are appropriately switched to be delivered to respective one of the pixel electrodes 461R, 461G, and 461B. Moreover, an alignment film 412 is formed so as to cover the pixel electrodes 461R, 461G, and 461B and the insulation portion 411. The alignment film 412 is capable of controlling the alignment property of the liquid crystal layer 43 together with a later-described alignment film 423.

The opposing substrate 42 has, as a base thereof, the transparent substrate 42A similar to the TFT substrate 41. On the liquid crystal layer 43 side (the negative Z direction side) of the transparent substrate 42A, a color filter layer 421, common electrodes 422, and an alignment film 423 are arranged in this order. The color filter layer 421 includes coloring material portions 462R, 462G, and 462B which constitute a portion of respective one of the sub-pixels 46R, 46G, and 46B. In this example, the coloring material portion 462R is configured to absorb light in a wavelength band outside that of red light, so that light having passed through the coloring material portion 462R is emitted while being colored into red light. Similarly, the coloring material portion 462G corresponds to green light, and the coloring material portion 462B corresponds to blue light, respectively. Moreover, a light blocking portion 424 is provided between the coloring material portions 462R, 462G, and 462B and between the pixels A2. The light blocking portion 424 is disposed to overlap with the insulation portion 411, so that the variety of types of wirings or the like are not visually perceived from the positive Z direction side which is an emitting side of the liquid crystal panel 40.

In the liquid crystal display device 1 having the above-described configuration, the light emitted from the illumination unit 10 becomes light representing the design pattern by the rotating reel 20 (see FIG. 1). This light is incident on the liquid crystal shutter device 30, is appropriately scattered in respective one of the plurality of light scattering portions, and is incident on the liquid crystal panel 40. Next, the operations of the liquid crystal shutter device 30 will be described herein below.

Figure 5A:
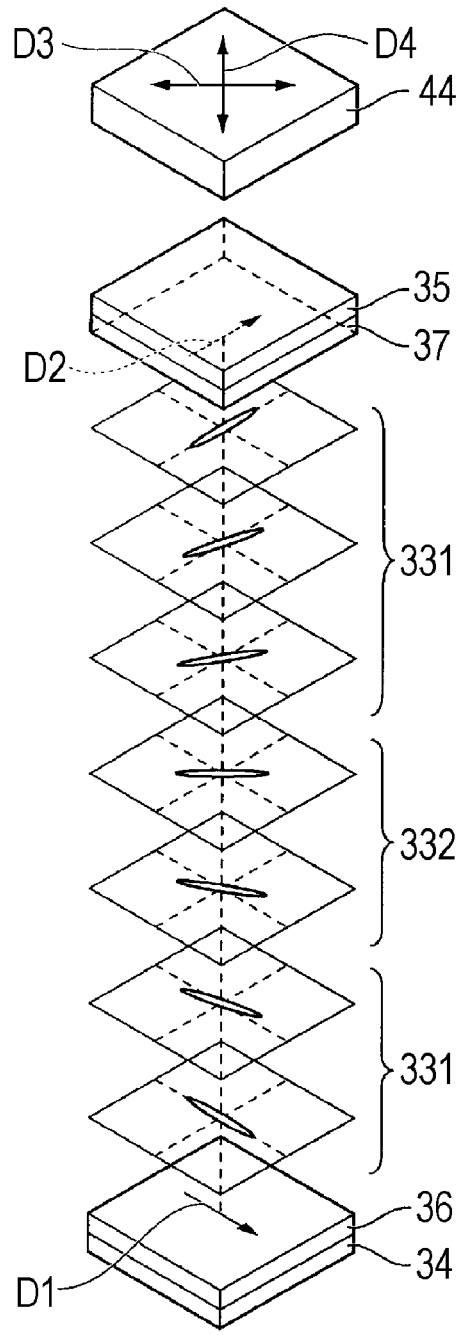
FIG. 5A is a schematic view of a non-scattering mode.
Figure 5B:
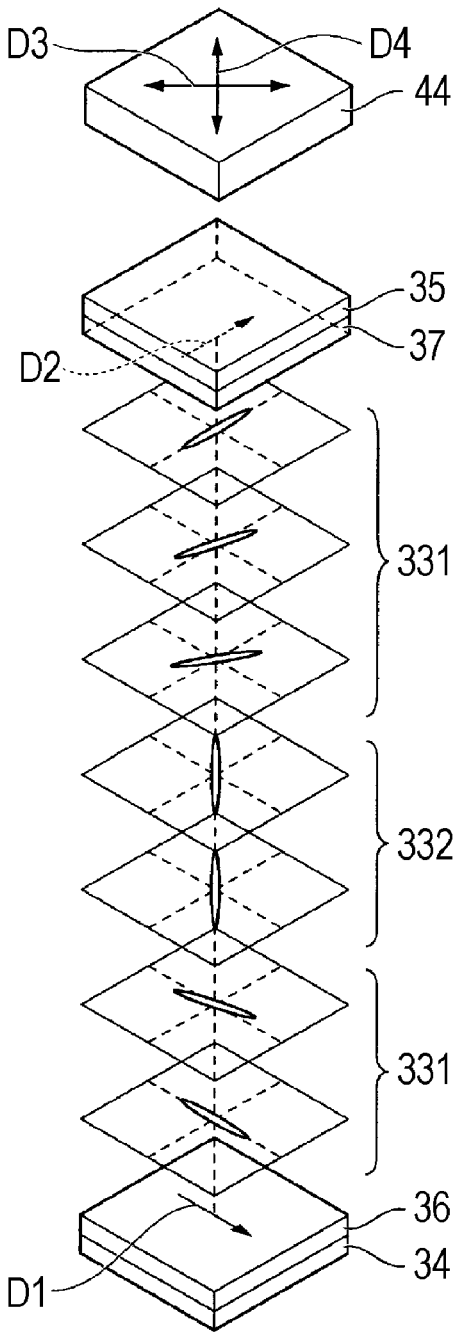
FIG. 5B is a schematic view of a scattering mode.

FIGS. 5A and 5B are schematic perspective views illustrating the operations of the liquid crystal shutter device 30. FIG. 5A corresponds to a state (non-scattering mode) where an electric voltage is not applied between the segment electrodes 34 and the common electrodes 35. FIG. 5B corresponds to a state (scattering mode) where an electric voltage is applied between them. In FIGS. 5A and 5B, in order to better show the twist angle of the polymers and the liquid crystal molecules, a pre-tilt angle is illustrated as 0 degrees.

As illustrated in FIG. 5A, under the non-electric field application state, the alignment direction of the polymers in the polymer portion 331 and the alignment direction of the liquid crystal molecules in the liquid crystal portion 332 change continuously. Specifically, on the side of the segment electrodes 34, the polymers are aligned in the direction D1 by the alignment regulating force of the first alignment film 36, while on the side of the common electrodes 35, the polymers are aligned in the direction D2 by the alignment regulating force of the second alignment film 37. In the present embodiment, an angle formed between the direction D1 and the direction D2, namely, the twist angle of this twisted structure is about 90 degrees as measured in the counter-clockwise direction. Moreover, an optical axis of the polarization layer 44 is in parallel with a direction (radial direction) D3 that is twisted by half (in this case, 45 degrees) the twist angle from the direction D1 toward the direction D2, and a direction D4 perpendicular to the direction D3 corresponds to the absorption axis of the polarization layer 44. Since the refractive index changes continuously between the polymer portion 331 and the liquid crystal portion 332, light incident from the side of the segment electrodes 34 is emitted from the side of the common electrodes 35 without being scattered. Among the emitted light, polarized light oscillating in the direction D4 of the absorption axis is absorbed in the polarization layer 44.

As illustrated in FIG. 5B, under the electric field application state, the alignment direction of the polymers in the polymer portion 331 is not changed from the non-electric field application state, while the liquid crystal molecules in the liquid crystal portion 332 are aligned in the electric field direction (the Z direction). Therefore, the refractive index becomes discontinuous at an interface of the polymer portion 331 and the liquid crystal portion 332, so that predetermined polarized light among light incident from the side of the segment electrodes 34 is emitted in a scattered manner. Next, a description of the scattered polarization direction will be provided herein below.

Figure 6A:
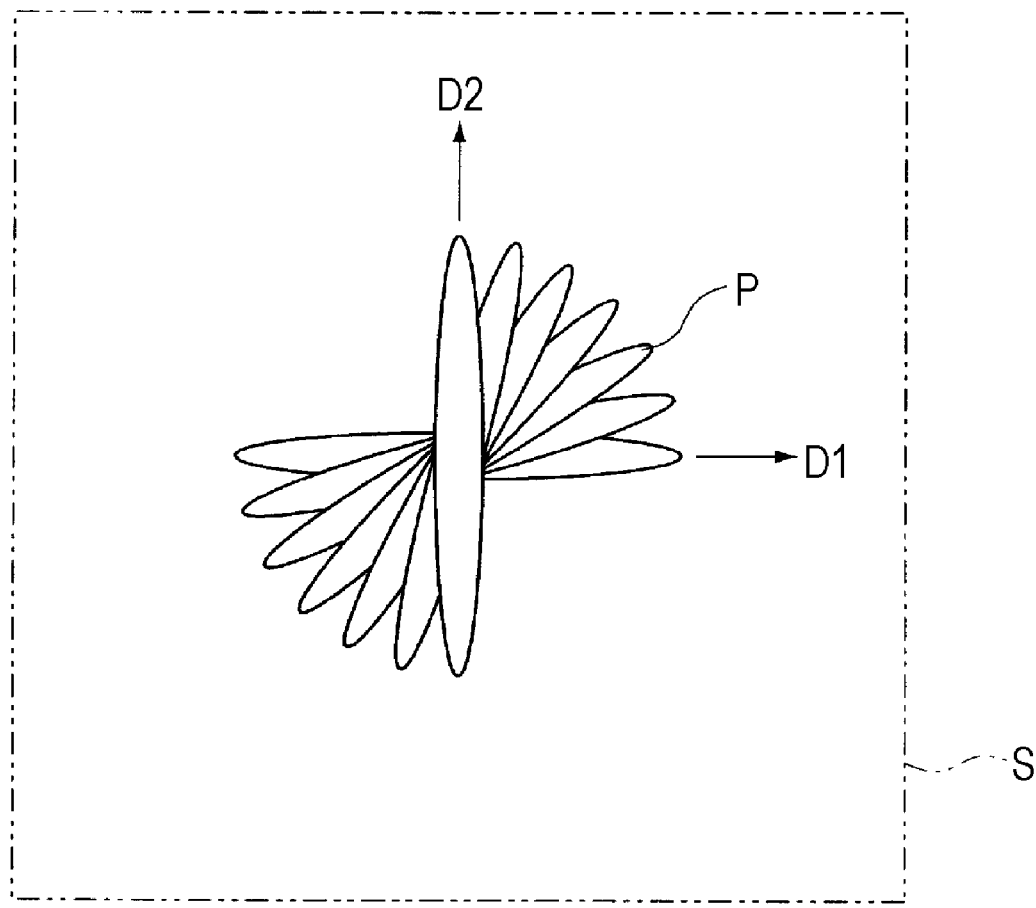
FIG. 6A is a schematic top plan view of a twisted structure.
Figure 6B:
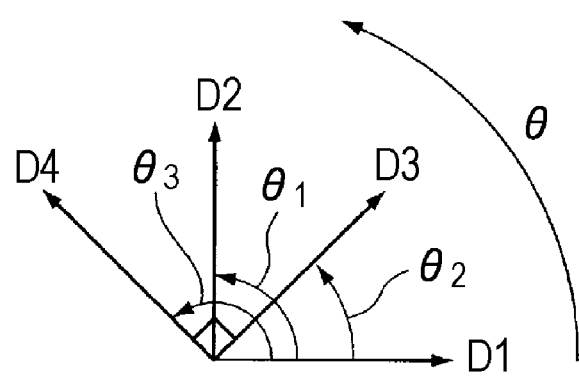
FIG. 6B is a view for explaining definitions.

FIG. 6A is a schematic view of the twisted structure projected on a plane S perpendicular to the axis of the twisted structure. FIG. 6B is a view for explaining definitions of the directions and angles. In FIG. 6A, symbol P represents the polymers or liquid crystal molecules constituting the twisted structure.

The molecule P has one end thereof being distributed in the range of $0 \leq \theta \leq \theta_1$ and the other end thereof being distributed in the range of $180° \leq \theta \leq (\theta_1+180°)$, assuming that the angle $\theta$ (degree) is defined in the counter-clockwise direction from the direction D1 and that the twist angle is $\theta_1$ (degree). Since the molecule P mainly scatters polarized light oscillating in the same direction as the alignment direction of the molecule, polarized light having a polarization axis thereof in that range is made easy to be scattered. On the other hand, polarized light having a polarization axis thereof in the range where the molecule P is not distributed, that is, in the range of $\theta_1 < \theta < 180°$, $(\theta_1+180°) < \theta < 360°$ is made hard to be scattered.

On the other hand, in the polarization layer 44, the direction D3 of the optical axis thereof is at an angle $\theta_2$ which is half the twist angle $\theta_1$ with respect to the direction D1, and the direction D4 of the absorption axis thereof is perpendicular to the direction D3. That is, the direction D3 satisfies the relation of $\theta_2=\theta_1/2$ and corresponds to a center value of the range where the polarized light is made easy to be scattered. Moreover, the direction D4 satisfies the relation of $\theta_3=\theta_2+90°$ and corresponds to a center value of the range where the polarized light is made hard to be scattered. In this way, under the electric field application state (see FIG. 5B), the polarization layer 44 allows polarized light of a predetermined direction among the scattered light to be passed to the side of the liquid crystal layer 43 while absorbing non-scattered leakage light so as not to be passed to the side of the liquid crystal layer 43.

Figure 7:
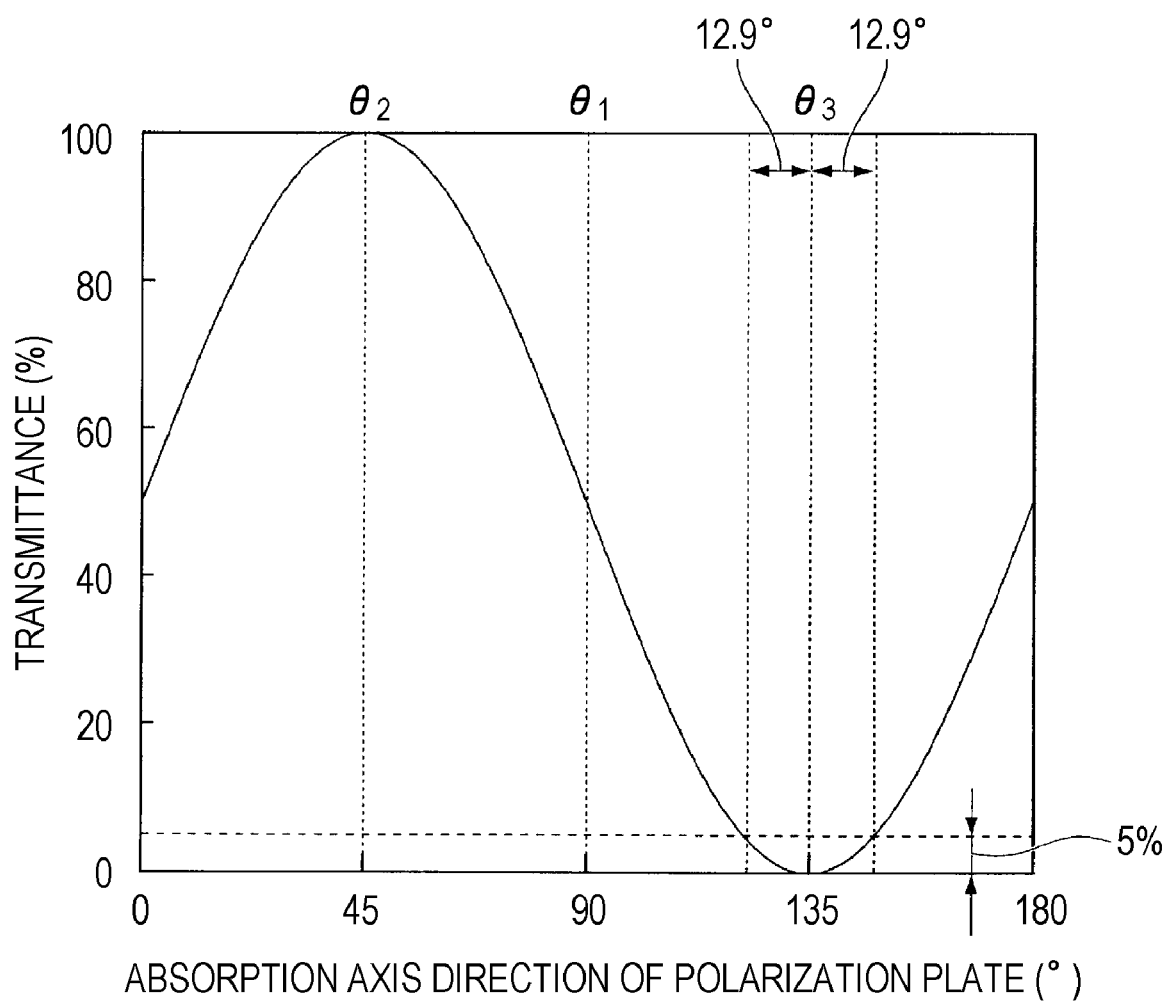
FIG. 7 is a graph of optical transmittance plotted with respect to an absorption axis direction.

FIG. 7 is a graph of transmittance of light having passed through the liquid crystal shutter device 30 plotted with respect to an absorption axis direction. In the graph of FIG. 7, the horizontal axis represents an angle formed between the absorption axis and the direction D1. In the graph of FIG. 7, the vertical axis represents a normalized value of the transmittance for light transmitted through the polarization layer 44, the light being emitted from the liquid crystal shutter device 30 in a state where an electric voltage of 12V is applied between the segment electrodes 34 and the common electrodes 35.

As illustrated in FIG. 7, the transmittance varies in a sinusoidal form with respect to the absorption axis direction. Since the light scattered by the liquid crystal shutter device 30 has a random polarization direction, it is considered that the light is absorbed in a predetermined ratio in the polarization layer 44 irrespective of the polarization axis direction. Therefore, it is considered that a change in the transmittance corresponds to a change in the amount of the light which has not been scattered by the liquid crystal shutter device 30.

As will be understood from FIG. 7, when an angle between the absorption axis of the polarization layer 44 and the direction D3 ($\theta_3$) is 12.9 degrees or less, a transmittance variation becomes 5 percent or less. Moreover, when the angle between the absorption axis and the direction D3 becomes 5.72 degrees or less, the transmittance variation is becomes 1 percent or less. Furthermore, when the angle between the absorption axis and the direction D3 is 4.03 degrees or less, the transmittance variation becomes 0.5 percent or less. Furthermore, when the angle between the absorption axis and the direction D3 is 1.79 degrees or less, the transmittance variation becomes 0.1 percent or less.

Here, as the transmittance variation becomes smaller, a difference in transmittance of light which has not been scattered by the liquid crystal shutter device 30 becomes hard to be visually perceived. That is, it is possible to decrease quality fluctuation between individual bodies. When the transmittance variation is 5 percent or less, the transmittance variation might not be substantially visually perceived in brightness (e.g., several hundred cd/m$^2$) used in the liquid crystal display device. Therefore, from the viewpoint of securing homogeneous quality between individual bodies, it is desirable that the angle between the absorption axis and the direction D3 ($\theta_3$) is 12.9 degrees or less. Moreover, the smaller the angle between the absorption axis and the direction D3 ($\theta_3$), the higher the homogeneity between individual bodies becomes. In particular, when the angle between the absorption axis and the direction D3 ($\theta_3$) is about 0 degree, it is possible to minimize the quality fluctuation between individual bodies.

In the liquid crystal display device having the above-described configuration, when image signals are delivered from the signal sources to the liquid crystal panel 40 illustrated in FIG. 4, an electric voltage is applied between the respective one of the pixel electrodes 461R, 461G, and 461B and the common electrodes 422, and thus, an electric field is applied to the liquid crystal layer 43. As a result, the azimuth angles of the liquid crystal molecules in respective one of the sub-pixels 46R, 46G, and 46B are changed in response to the image signals. In this manner, light passing through the sub-pixels is emitted with a polarization state thereof being changed. The emitted light is appropriately colored by the color filter layer 421, and a portion thereof is absorbed in the polarization layer 45 depending on the polarization state. In this way, light emitted from respective one of the sub-pixels 46R, 46G, and 46B has gradation levels corresponding to the image signals. These light components are visually perceived in a mixed form, and thus, full-color display can be realized.

Light emitted after passing through the light scattering portion in the non-scattering mode contains both image information applied by the rotating reels 20 and image information applied by the liquid crystal panel 40, so that the design pattern of the rotating reels 20 and the image by the liquid crystal panel 40 are displayed in an overlapping manner.

Moreover, light emitted after passing through the light scattering portion in the scattering mode is deprived of the image information applied by the rotating reels 20 by the scattering, so that only the image by the liquid crystal panel 40 is displayed.

In this manner, by appropriately switching between the scattering mode and the non-scattering mode, it is possible to switch between display and non-display of the design pattern of the rotating reels 20. Moreover, by allowing the respective one of the plurality of light scattering portions to switch the modes, it is possible to switch between display and non-display of a portion of one design pattern.

In the liquid crystal display device 1 according to the present embodiment, since the direction D4 perpendicular to the direction D3 that is twisted by half the twist angle of the twisted structure from the direction D1 corresponds to the absorption axis of the polarization layer 44, it is possible to cause the leakage light which has not been scattered in the scattering mode to be absorbed in the polarization layer 44. Therefore, the leakage light is prevented from being modulated by and emitted from the liquid crystal layer 43, and the image represented by the leakage light, namely, the design pattern which is not to be displayed, or a portion thereof is prevented from being visually perceived. Therefore, it is possible to effectively switch between on and off of the image by the rotating reels (image information application unit) 20, whereby it is possible to obtain high-quality and versatile display images.

Moreover, in the first embodiment, a configuration has been illustrated in which the illumination unit 10, the liquid crystal shutter device 30, and the liquid crystal panel 40 are provided in common for three rotating reels 20, a configuration may be used in which more than one of the illumination unit, the liquid crystal shutter device, and the liquid crystal panel is provided independently for each rotating reel. Furthermore, as the image information application unit, in lieu of the rotating reels 20 configured to emit transmitted light, one may be used which is configured to emit light reflected from the rotating reels to the side of the liquid crystal shutter device, and a variety of types of display device such as a liquid crystal panel may be used with the image information application unit.

Furthermore, in lieu of configuring the second substrate 32, the polarization layer 44, and the TFT substrate 41 as independent members, a substrate having these member integrated therein may be used. Such a substrate may be obtained, for example, by forming a polarization element such as a wire grid on one surface of a transparent substrate and forming common electrodes thereon, while forming a variety of types of components constituting a TFT substrate on the other surface side. By doing so, it is possible to achieve a low profile of the liquid crystal display device.

Second Embodiment

Next, a description of a liquid crystal display device according to a second embodiment will now be provided herein below. The present embodiment is different from the first embodiment, in that the twist angle in the polymer dispersion type liquid crystal layer of the liquid crystal shutter device is larger than 180 degrees and smaller than 360 degrees. Other configurations are the same as those of the first embodiment, and redundant description thereof will be omitted.

FIGS. 8A and 8B are schematic perspective views illustrating the operations of the liquid crystal shutter device 30 according to the second embodiment. FIG. 8A corresponds to a state (non-scattering mode) where an electric voltage is not applied between the segment electrodes 34 and the common electrodes 35. FIG. 8B corresponds to a state (scattering mode) where an electric voltage is applied between them.

As illustrated in FIG. 8A, in the polymer dispersion type liquid crystal layer 33 (see FIG. 4) according to the present embodiment, the polymers of the polymer portion 331 are aligned in the direction D1 on the side of the segment electrodes 34, while they are aligned in the direction D2 on the side of the common electrodes 35. An angle (twist angle) between the direction D1 and the direction D2 is about 270 degrees as measured in the counter-clockwise direction. Moreover, the optical axis of the polarization layer 44 is in parallel with the direction D3 that is twisted from the direction D1 toward the direction D2 by half an angle (in this case, 45 degrees) subtracted from the twist angle by 180 degrees, and the direction D4 perpendicular to the direction D3 corresponds to the absorption axis of the polarization layer 44.

In the liquid crystal shutter device according to the present embodiment, similar to the first embodiment, in the non-scattering mode, the refractive index changes continuously between the polymer portion 331 and the liquid crystal portion 332. Therefore, light incident on the liquid crystal shutter device 30 is emitted substantially without being scattered. Moreover, as illustrated in FIG. 8B, in the scattering mode, the liquid crystal molecules of the liquid crystal portion 332 are aligned in the electric field direction, so that the refractive index becomes discontinuous between the polymer portion 331 and the liquid crystal portion 332. Therefore, the incident light is emitted while being scattered at an interface between the polymer portion 331 and the liquid crystal portion 332.

In the present embodiment, since the twist angle is larger than 180 degrees, it is possible to cause polarized light having a polarization direction ranging from 0 degree to 360 degrees on a projection plane to be scattered by portions of the twisted structure having an alignment direction ranging from 0 degree to 180 degrees. Moreover, the portion of the twisted structure having the alignment direction ranging from 180 degrees or more to the twist angle is able to perform the same function as the polymer dispersion type liquid crystal layer according to the first embodiment. In this way, it is possible to greatly reduce the leakage light in the scattering mode, and the leakage light produced in little amount can be absorbed in the polarization layer 44. Therefore, the image represented by the leakage light, namely, the design pattern which is not to be displayed, or a portion thereof is certainly prevented from being visually perceived, whereby it is possible to effectively switch between on and off of the image by the rotating reels 20. Therefore, according to the liquid crystal display device of the second embodiment, it is possible to obtain high-quality and versatile display images.

Electronic Apparatus

Figure 9:
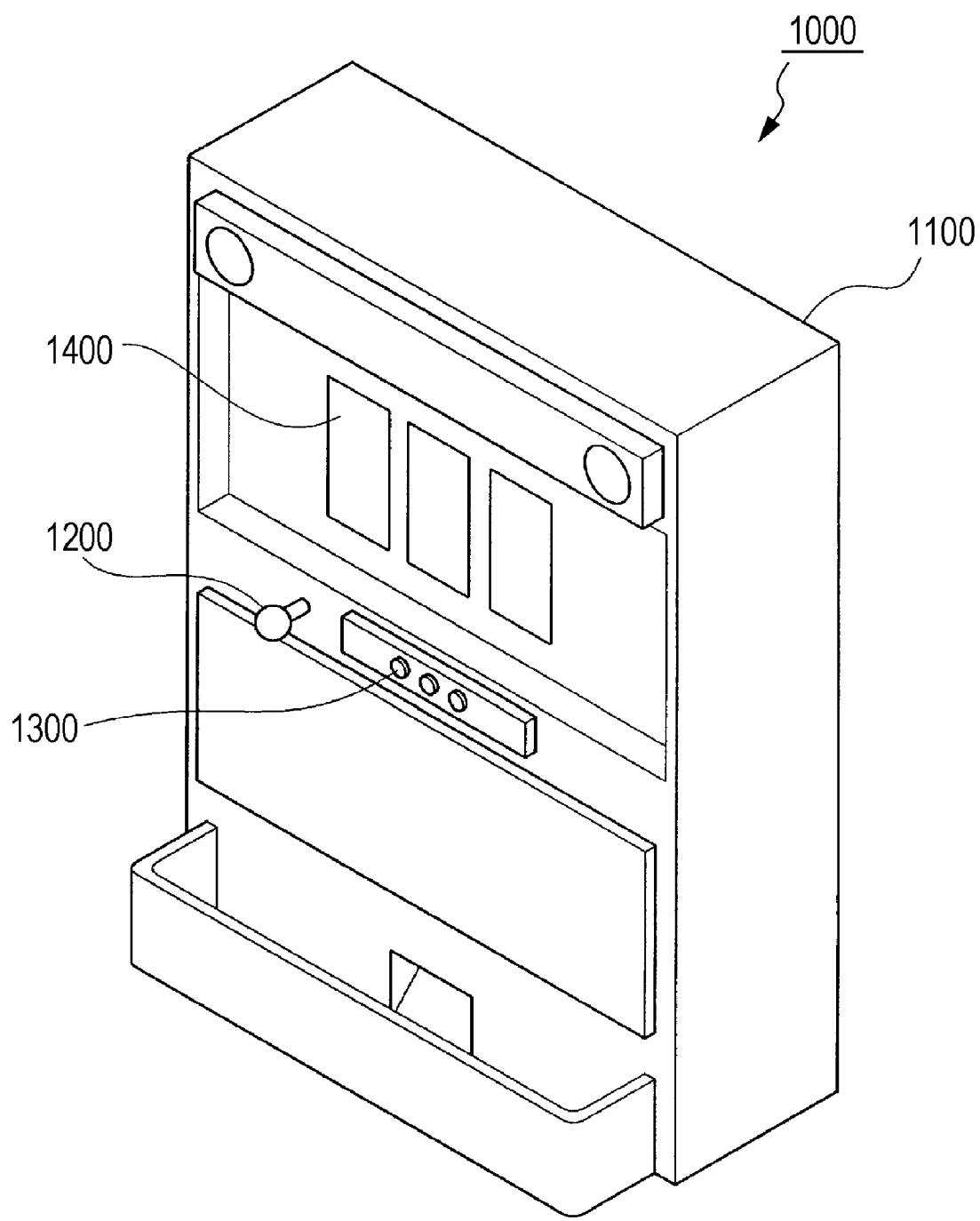
FIG. 9 is a simplified perspective view of an example of an electronic apparatus according to the present invention.

Next, an embodiment of an electronic apparatus according to the present invention will be described with reference to FIG. 9. FIG. 9 is a perspective view illustrating of a simplified structure of a pachislo machine 1000 as the electronic apparatus according to the present invention. The pachislo machine 1000 includes a box-like casing 1100, and a start lever 1200, a stop button 1300, a display unit 1400, and the like which are formed on one surface side (display side) of the casing 1100. The display unit 1400 is configured by the liquid crystal display device (see FIG. 1) according to the present invention. Inside the casing 1100, three rotating reels, a liquid crystal shutter device, a liquid crystal panel, a control unit for controlling them and the like are accommodated in this order toward the display side. Outside the casing 1100, the start lever 1200 for activating the rotating reels, the stop buttons 1300 for operating respective one of the rotating reels, and the like are provided.

In the pachislo machine 1000, when the start lever 1200 is operated in a state where coins are inserted therein, the rotating reels are activated and the control unit makes a judgment as to correct answers or selects representations based on a lottery system using random numbers or the like. When the stop button 1300 is operated in a state where the rotating reels are rotating, the control unit controls a rotation angle of respective one of the rotating reels based on the judgment result on the correct answers and each one of the rotating reels stops rotating with a predetermined design pattern disposed on the display side. Moreover, the control unit is configured to supply a predetermined control signal or an image signal to the liquid crystal shutter device or the liquid crystal panel regardless of whether the rotating reels are rotating or stop rotating. Therefore, even when the liquid crystal shutter device appropriately causes a portion or the entire of the rotating reels to be in a non-display state, the liquid crystal panel displays a predetermined image.

Since the electronic apparatus (pachislo machine) 1000 according to the present embodiment uses the liquid crystal display device according to the present invention in the display unit 1400, it is possible to certainly prevent the design pattern which is not to be displayed from being visually perceived. As a result, it is possible to display game results or the like with versatile representations, the electronic apparatus can be effectively used. Moreover, in an electronic apparatus like the pachislo machine 1000 in which the user (gamer) operates the apparatus while visually perceiving the image (design pattern) of the image information application unit (rotating reels) 20, the operation duration of the non-scattering mode is generally longer than the operation duration of the scattering mode. According to the present invention, since the apparatus operates in the non-scattering mode under the non-electric field application state, compared with the case where it operates in the non-scattering mode under the electric field application state, it is possible to achieve a reduced consumption power and a longer operating life of the liquid crystal shutter device.

As an electronic apparatus to which the present invention can be applied, in addition to the pachislo machine 1000, a pachinko machine, a game machine, or the like can be exemplified. Moreover, by appropriately configuring the image information application unit with the liquid crystal panel, a slide, or the like, the image information application unit can be suitably used as image display unit, e.g., of a cellular phone, an electronic book, a projector, a personal computer, a digital still camera, a television receiver, a view-finder type or monitor direct-view type video tape recorder, a car navigation device, a pager, an electronic notebook, a calculator, a word processor, a workstation, a video phone, a POS terminal, a device having a touch panel, and the like. When the present invention is applied to these electronic apparatuses, the apparatuses will be effectively used and capable of providing versatile display images as long as they are configured to include the image information application unit.

The entire disclosure of Japanese Patent Application Nos: 2008-081067, filed Mar. 26, 2008 and 2008-293370, filed Nov. 17, 2008 are expressly incorporated by reference herein.

What is claimed is:

1. A liquid crystal display device comprising:
   a liquid crystal panel;
   an image information application unit disposed on a side opposite to a display side of the liquid crystal panel;
   an illumination unit for irradiating light to the image information application unit;
   a liquid crystal shutter device disposed between the image information application unit and the liquid crystal panel;
   a polymer dispersion type liquid crystal layer disposed in the liquid crystal shutter device and containing liquid crystal molecules and polymers, in which the polymers are aligned in a twisted manner at a twist angle larger than 0 degree and smaller than 180 degrees; and
   a polarization layer disposed between the liquid crystal panel and the liquid crystal shutter device so that in a rotation direction where the polymers are aligned in a twisted manner, an absorption axis thereof is set in a direction substantially perpendicular to a radial direction where the polymers are twisted by half the twist angle.

2. A liquid crystal display device comprising:
   a liquid crystal panel;
   an image information application unit disposed on a side opposite to a display side of the liquid crystal panel;
   an illumination unit for irradiating light to the image information application unit;
   a liquid crystal shutter device disposed between the image information application unit and the liquid crystal panel;
   a polymer dispersion type liquid crystal layer disposed in the liquid crystal shutter device and containing liquid crystal molecules and polymers, in which the polymers are aligned in a twisted manner at a twist angle larger than 180 degree and smaller than 360 degrees; and
   a polarization layer disposed between the liquid crystal panel and the liquid crystal shutter device so that in a rotation direction where the polymers are aligned in a twisted manner, an absorption axis thereof is set in a direction substantially perpendicular to a radial direction where the polymers are twisted by half an angle subtracted from the twist angle by 180 degrees.

3. The liquid crystal display device according to claim 1, wherein the absorption axis of the polarization layer and the radial direction are at an angle of 12.9 degrees or less.

4. The liquid crystal display device according to claim 1, further comprising:
   a pair of electrodes disposed in the liquid crystal shutter device so as to sandwich the polymer dispersion type liquid crystal layer;
   a first alignment film disposed between a first electrode of the pair of electrodes and the polymer dispersion type liquid crystal layer and having an alignment regulating force of causing the polymers to be aligned in a first direction; and
   a second alignment film disposed between a second electrode of the pair of electrodes and the polymer dispersion type liquid crystal layer and having an alignment regulating force of causing the polymers to be aligned in a second direction that is twisted by the twist angle in the rotation direction from the first direction.

5. The liquid crystal display device according to claim 1, wherein the polymer dispersion type liquid crystal layer is formed with a chiral agent added thereto.

6. The liquid crystal display device according to claim 1, wherein the illumination unit is disposed in the image information application unit at a side opposite to a side where the liquid crystal panel is disposed.

7. An electronic apparatus having a display unit configured by the liquid crystal display device according to claim 1.

* * * * *